(12) United States Patent
Goud et al.

(10) Patent No.: US 7,370,324 B2
(45) Date of Patent: May 6, 2008

(54) SWITCHING BETWEEN A SERVICE VIRTUAL MACHINE AND A GUEST VIRTUAL MACHINE IN A VIRTUAL MACHINE MONITOR ENVIRONMENT

(75) Inventors: Gundrala D. Goud, Olympia, WA (US); Vincent J. Zimmer, Federal Way, WA (US); Mallik Bulusu, Olympia, WA (US); Mark S. Doran, Olympia, WA (US); David K. Dorwin, Puyallup, WA (US); Michael A Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 923 days.

(21) Appl. No.: 10/674,686

(22) Filed: Sep. 30, 2003

(65) Prior Publication Data

US 2005/0081212 A1    Apr. 14, 2005

(51) Int. Cl.
*G06F 9/455* (2006.01)
*G06F 9/46* (2006.01)
*G06F 11/00* (2006.01)

(52) U.S. Cl. .......................... 718/1; 718/100; 714/15; 714/25; 714/39

(58) Field of Classification Search ............ 718/1–108; 714/100, 2, 15, 25, 39
See application file for complete search history.

(56) References Cited

U.S. PATENT DOCUMENTS 5,437,033 A * 7/1995 Inoue et al. ................... 714/10
7,035,963 B2 * 4/2006 Neiger et al. ................... 711/6
7,082,598 B1 * 7/2006 Le et al. ....................... 717/127
2003/0061497 A1  3/2003 Zimmer

OTHER PUBLICATIONS

Jeremy Sugerman, Ganesh Venkitachalam and Beng-Hong Lim; Virtualizing I/O on VMware Workstation's Hosted Virtual Machine Monitor; Proceedings of the 2001 USENIX Annual Technical Conference.*
Logical Partition Security in the IBM eServer pSeries 690, IBM 2002.*
Andrew Whitaker, Scale and Performance in the Denali Isolation Kernel, ACM SIGOPS Operating Systems Review, 2002.*

* cited by examiner

*Primary Examiner*—Meng-Al T. An
*Assistant Examiner*—Abdullah-Al Kawsar
(74) *Attorney, Agent, or Firm*—Blakely, Sokoloff, Taylor & Zafman LLP

(57) ABSTRACT

A method and system to switch between a Service virtual machine (VM) and a Guest VM in a virtual machine monitor (VMM) of a computer system. The VMM is loaded on the computer system to support a Service VM and a Guest VM. The Service OS is booted in the Service VM during the pre-boot phase. The Guest OS is booted in the Guest VM of the computer system. During OS runtime of the Guest OS, a VM switch is performed from the Guest VM to the Service VM without rebooting the computer system. The Service OS includes diagnostic tools to analyze the Guest OS. In one embodiment, the VM switch is performed by firmware of the computer system. In another embodiment, the VMM operates in accordance with an Extensible Firmware Interface (EFI) framework standard.

26 Claims, 5 Drawing Sheets

SWITCHING BETWEEN A SERVICE VIRTUAL MACHINE AND A GUEST VIRTUAL MACHINE IN A VIRTUAL MACHINE MONITOR ENVIRONMENT

BACKGROUND

1. Field of Invention

The field of invention relates generally to computer systems and, more specifically but not exclusively, relates to switching between a service virtual machine and a guest virtual machine in a virtual machine monitor environment.

2. Background Information

In a typical PC architecture, the initialization and configuration of the computer system by the Basic Input/Output System (BIOS) is commonly referred to as the pre-boot phase. It is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system. As computer systems have become more sophisticated, the operational environment between the application and OS levels and the hardware level is generally referred to as the firmware or the firmware environment.

In today's servers, the system architecture allows for a bi-modal server management. Generally, a server has a server management OS and a guest operating system (OS). The management OS includes diagnostic tools and utilities to service the guest operating system and the server environment. The guest OS operates as a conventional operating system. Usually, the system first boots the management OS from the system management partition, and then the system must be rebooted in order to run the guest OS.

However, rebooting into the guest OS results in the loss of all state information from the management OS. Also, if there is a system failure while running in the guest OS, the machine must be rebooted back into the management OS for diagnosis. This reboot results in the loss of key state information that could be analyzed to discover system problems.

Also, some guest OS faults are so severe that the guest OS cannot take a snapshot of its own system state or perform an error dump to a storage device. Thus, vital information for system managers will be lost because the only solution is to reboot the system. Further, if the same error repeats itself, for example due to a mis-configured software patch, the system may continually crash without a scheme to diagnose the error.

BRIEF DESCRIPTION OF THE DRAWINGS

The present invention is illustrated by way of example and not limitation in the accompanying figures.

DETAILED DESCRIPTION

Embodiments of a method and system to switch a computer system between a Service virtual machine (VM) and a Guest VM are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment of the present invention, a computer system switches between a Service virtual machine and a Guest virtual machine in a Virtual Machine Monitor (VMM) environment. During the pre-boot phase of the computer system, a Service OS is executed. A virtual machine switch is performed and the Guest operating system is booted in the Guest VM to begin the OS runtime. The computer system may seamlessly switch between the Guest VM and the Service VM in real-time. In the event of a Guest OS failure, the computer system may switch into the Service OS environment to diagnose the Guest OS fault without rebooting the computer system.

In one embodiment of the present invention, firmware of a computer system operates in accordance with an extensible firmware framework known as the Extensible Firmware Interface (EFI) (EFI Specification, Version 1.10, Dec. 1, 2002, may be found at http://developer.intel.com/technology/efi). EFI is a public industry specification that describes an abstract programmatic interface between platform firmware and shrink-wrap operating systems or other custom application environments. The EFI framework standard includes provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs (Read-Only Memory), various persistent storage devices (e.g., magnetic disks, optical disks, etc.), and from one or more computer systems over a computer network.

Figure 1:
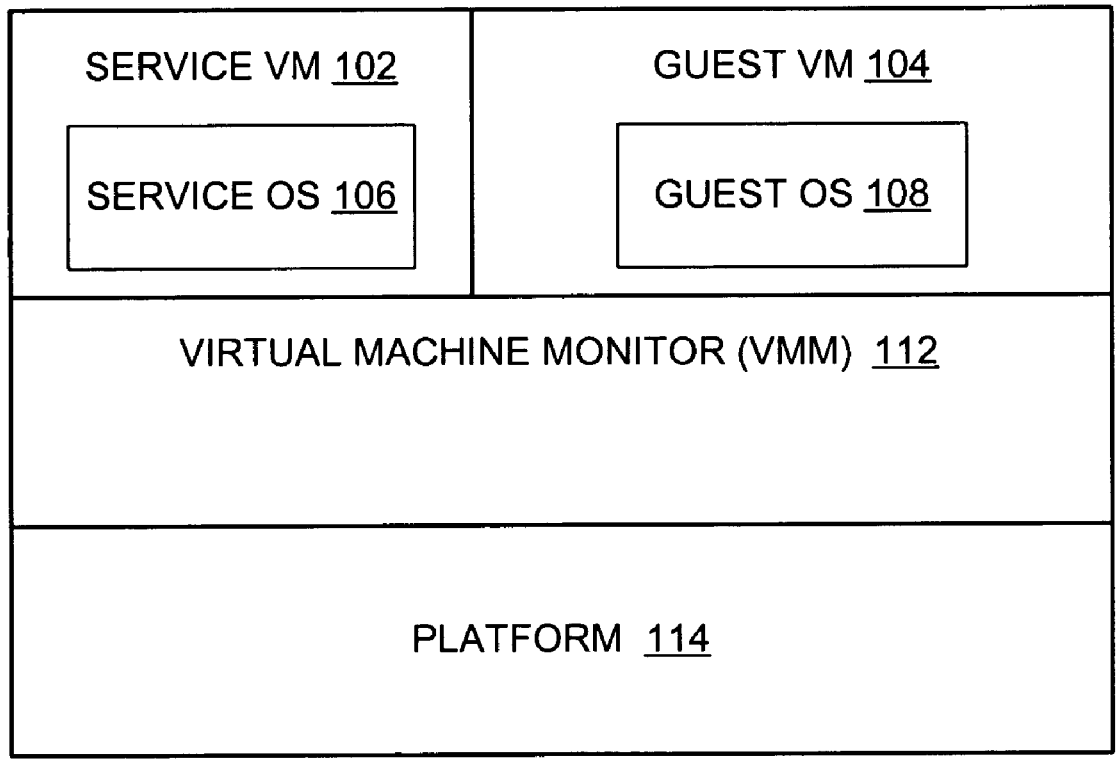
FIG. 1 is a schematic diagram illustrating one embodiment of a computer system environment in accordance with the teachings of the present invention.

FIG. 1 is a schematic diagram illustrating one embodiment of a computer system environment to switch between a Service VM and a Guest VM. FIG. 1 shows a Virtual Machine Monitor (VMM) 112 layered on a platform 114. The platform 114 is the hardware of the computer system (a.k.a., the "real" machine.) The VMM 112 supports a Service Virtual Machine (VM) 102 and a Guest VM 104. The Service VM 102 includes a Service OS 106 and the Guest VM 104 includes a Guest OS 108. Only one Guest VM 104 is described herein for the sake of clarity, but it will be understood the embodiments of the present invention may operate with more than one Guest VM with each Guest VM executing an OS. For example, a Guest VM1 may include Windows NT and a Guest VM2 may include the Linux OS. In such a scheme, the Service OS 106 would be able to observe and diagnose the activity of both Guest VM1 and Guest VM2.

The Virtual Machine Monitor (VMM) 112 provides a software layer to run on the hardware of a computer system to enable the operation of multiple virtual machines. Each VM behaves like a complete physical machine that can run its own OS. Usually, each VM is given the illusion that it is the only physical machine. The VMM takes control of the system whenever a VM attempts to perform an operation that may affect the operations of other VMs or the hardware (e.g., a system call). The VMM will affect the operation for the VM to ensure the whole computer system is not disrupted. Different operating systems, or separate instances of the same operating system, may execute in each VM. Since VMs are usually isolated from each other, an OS crashing in one VM usually does not affect the other VMs.

In one embodiment, the Service OS 106 is a self-contained operating system that includes a variety of tools and applications to analyze and diagnose the computer system. In one embodiment, the Service OS includes a file management system, memory management, Input/Output resources, and a network capability. Generally, the Service OS is smaller in size than conventional operating systems. In one embodiment, the Service OS is approximately 1 megabyte in size. The Service OS may be stored in a non-volatile storage device (such as Flash memory), an EFI system partition, a Host Protected Area (HPA) of a hard disk, a network repository, or the like.

Figure 2:
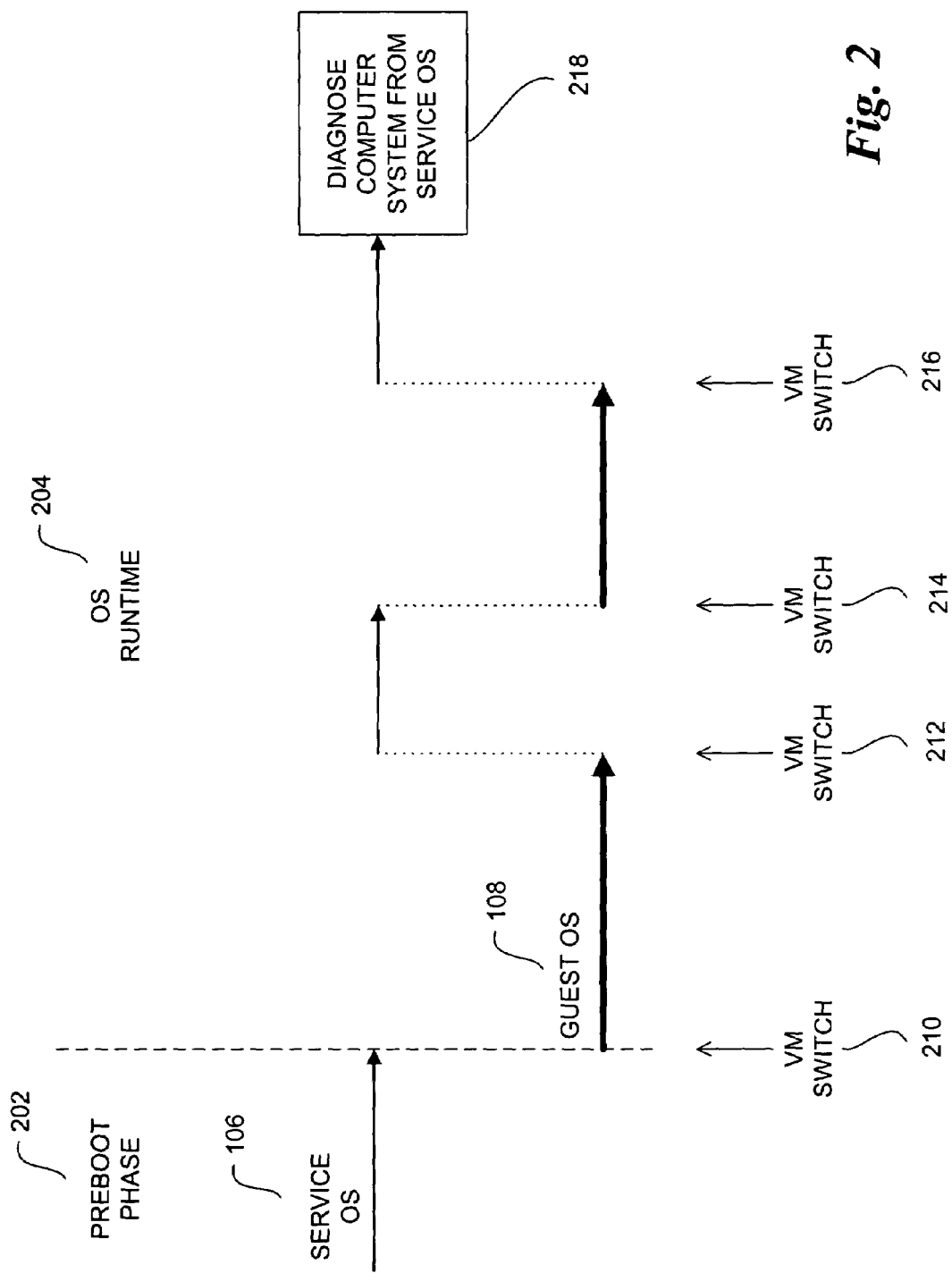
FIG. 2 is a timeline diagram illustrating one embodiment of a sequence to switch a computer system between a Service OS and a Guest OS in accordance with the teachings of the present invention.

FIG. 2 is a timeline diagram illustrating one embodiment of a sequence to switch between a Service VM and a Guest VM of a computer system. The timeline is divided into a pre-boot phase 202 and an OS runtime phase 204 of a computer system. In one embodiment, the computer system is a server. The Service OS 106 boots as part of the pre-boot phase of the computer system. In one embodiment, the Service OS 106 runs in an EFI environment; in another embodiment, the Service OS 106 runs in a ROM-DOS (Read-Only Memory-Disk Operating System) environment.

During the startup of the Service OS 106 in the pre-boot phase 202, the Service OS 106 may obtain system resources, such as memory, that the Service OS 106 may need for execution. By establishing the VMM environment during the pre-boot phase, the VMM may virtualize items that the firmware has intimate knowledge of, such as, but not limited to, the chipset, Advanced Configuration and Power Interface (ACPI) configurations, integrated Input/Output subsystems, such as the ATA (Advanced Technology Attachment) disk interface, or the like. Invoking the Service OS 106 during pre-boot allows firmware knowledge to be accessible to the Service OS 106.

After the pre-boot phase is completed, the computer system proceeds to a OS runtime phase 204. In one embodiment, the OS runtime phase 204 starts at the execution of a Guest OS 108 and control of the computer system is handed over from the computer system firmware to the Guest OS 108. The Guest OS 108 proceeds through a startup sequence and executes on the computer system.

The boot of the Guest OS 108 is preceded by a Virtual Machine (VM) switch 210 to the Guest VM 104. Generally, a VM switch is the transition between the Service VM and the Guest VM. Usually, one VM is active at a time and the VMs time-slice execution on the computer system. Thus, a processor, such as a CPU, runs only one OS at a time.

Rather than requiring a reboot of the computer system, a VM switch occurs in real-time to seamlessly multiplex between multiple computer system virtual machine environments. If the Guest VM suffers a critical failure, then the computer system may switch to the Service VM, without rebooting, to perform acute analysis of the failed Guest VM and Guest OS. In one embodiment, the VM switch is performed by firmware of the computer system. For example, the firmware may maintain a list of the VM's to schedule, time-slice for each VM, maintain exit conditions for a given VM, etc. In another embodiment, a chipset and processor of the computer system include hardware augmentation to support virtualization. Such hardware augmentation reduces the cost in clock cycles to perform a VM switch compared to making the VM switch primarily in software. The processor may include microcode to assist in virtualization of the computer system.

A VM switch can be activated automatically in response to a system event or activated by a user of the computer system. In one embodiment, a user may set-up exit event parameters during pre-boot. If one of these policies is triggered when the Guest OS 108 is executing, a VM switch to the Service OS will occur (discussed further below).

At VM switch 212, the computer system transitions to the Service VM 102 and Service OS 106. The computer system continues to operate in the Service VM 102 environment. The user may use the Service OS 106 to observe and analyze the function of the Guest OS 108 as well as other aspects of the computer system. The Service VM has the ability to "peak over the fence" into other VMs. For example, a user of the computer system may have initiated the VM switch 212. The user can use the Service OS 108 to monitor the functioning of the Guest OS 108.

At VM switch 214, the computer system transitions back to the Guest OS 108. The computer system continues to operate in the Guest VM 104 environment. At VM switch 216, the computer system switches to the Service VM and Service OS 106. For example, the computer system may have automatically switched into the Service OS 106 due to a trap event or a polling event (discussed below.) In this case, the user can proceed to analyze and diagnose the computer system, including Guest OS 108, from the Service OS 106, as shown in a block 218.

Figure 3:
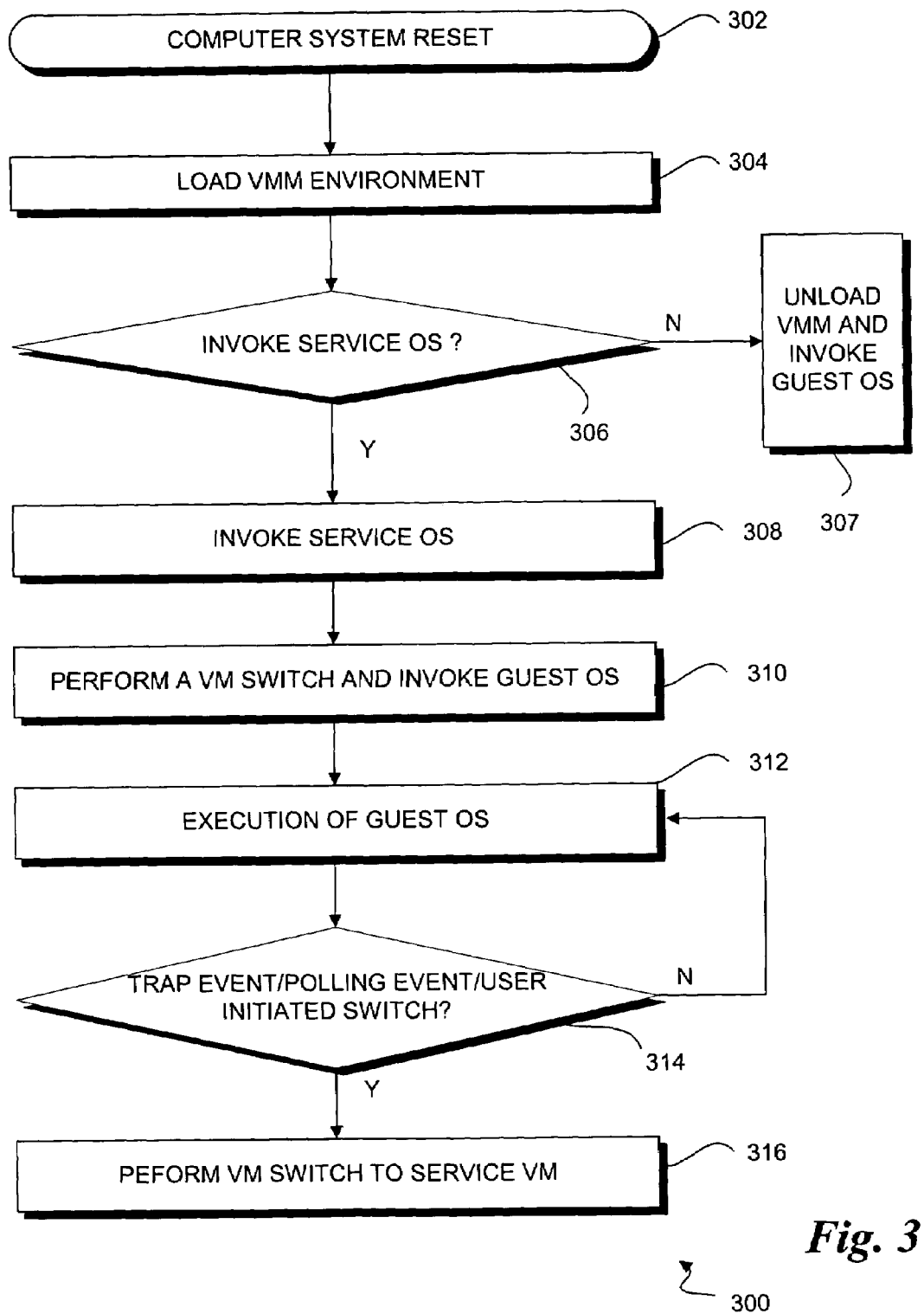
FIG. 3 is a flowchart illustrating one embodiment of the logic and operations to switch a computer system between a Service OS and a Guest OS in accordance with the teachings of the present invention.

Referring to FIG. 3, one embodiment of a method to switch between a Service VM and a Guest VM of computer system is shown. In a block 302, a computer system is reset. Pre-boot initialization of the computer system will begin based on BIOS firmware available to the computer system. In one embodiment, the system boot instructions will begin initializing the computer system by conducting a Power-On Self-Test (POST) routine, initializing system board functions, checking for any expansion boards that hold additional BIOS code, and loading such BIOS code if any is found.

Proceeding to a block 304, a Virtual Machine Monitor (VMM) environment is loaded on the computer system.

Figure 4:
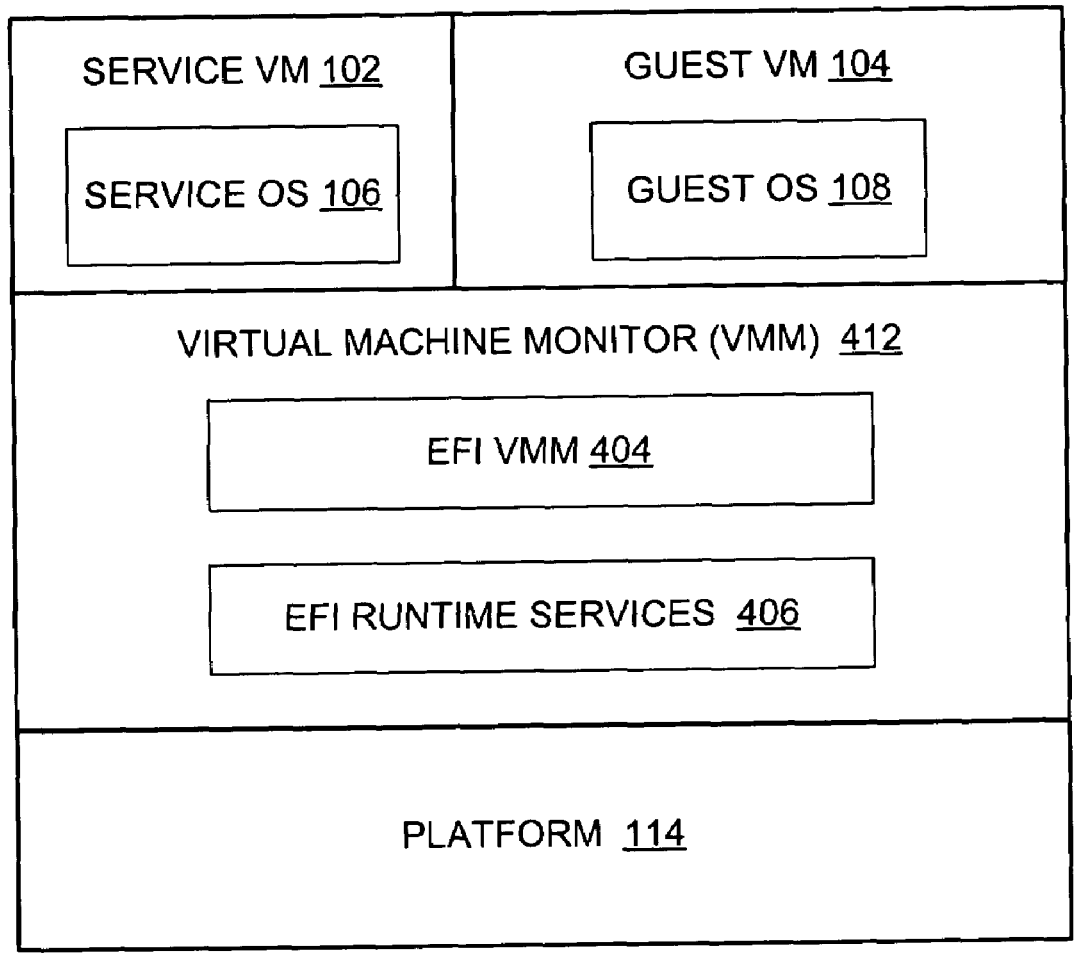
FIG. 4 is a schematic diagram illustrating one embodiment of a computer system environment in accordance with the teachings of the present invention.

Referring to FIG. 4, one embodiment of a VMM 412 utilizing aspects of the EFI environment is shown. The VMM 412 includes EFI VMM 404 and EFI Runtime Services 406. The EFI VMM 404 is a VMM established in firmware of the computer system to operate in accordance with the EFI specification. EFI Runtime Services 406 are services available to the computer system during both pre-boot and OS runtime. Runtime Services include, but are not limited to, Reset Services, Status Code Services, and Virtual Memory Services. In one embodiment, the EFI VMM 404 works with processor virtualization augmentation to support the VMM 412. In one embodiment, the EFI VMM 404 includes a VM Scheduler (not shown) to arrange when a switch between VM's is to occur and a VM Resource Manager (not shown) to manage computer system resources for the VM's, such as managing how much memory to expose to each VM, etc.

During the pre-boot phase, the computer system determines if a Service OS should be invoked, as depicted in a decision block 306. In one embodiment, the computer system displays a query to a user of the computer system; in another embodiment, the computer system refers to a pre-planned policy for the computer system. If the answer to decision block 306 is no, then the logic proceeds to a block 307 to unload the VMM and to invoke the Guest OS in a non-VMM environment. If the answer to decision block 306 is yes, then the logic proceeds to a block 308 to invoke the Service OS.

In block 308, the Service OS is booted while the computer system is still in the pre-boot phase. After the pre-boot phase has been completed, a VM switch is performed to the Guest VM and the Guest OS is invoked, as shown in a block 310. In one embodiment, the VM switch is completed by firmware of the computer system.

As shown in a block 312, the Guest OS executes on the computer system. In one embodiment, the Guest OS is not complicit with the Service OS. The Guest OS has no knowledge of the Service OS and no knowledge of the system resources, such as memory, that the Service OS has acquired for its own use. In another embodiment, the Guest OS is aware of the Service OS. In this instance, the EFI VMM may act as an intermediary to send control and configuration messages between OS's in different VM's.

The logic proceeds to a decision block 314 to determine if an event has occurred to cause a VM switch. The VM switch may be triggered by a trap event, a polling event, a user initiated switch, or any combination thereof.

A trap event is an event that violates a predetermined policy condition of the computer system. Whenever such a violation occurs and is detected, a VM switch occurs to put the computer system in the Service OS environment. Examples of such policy events include, but are not limited to, the Guest OS attempts to write to a particular region of memory, a particular interrupt occurs that signifies a catastrophic event has occurred, or the like. In one embodiment, the VMM monitors the behavior of the VM's and their respective OS's to determine if a policy has been violated.

A polling event is a periodic check of the Guest VM to determine if the Guest VM and Guest OS are functioning properly. The operation of the Guest OS may be analyzed on a regular schedule to determine if a fault has occurred. For example, the Guest OS may be checked every 10 seconds to determine if the Guest OS is hung. In one embodiment, the VMM performs the periodic check of the Guest OS. In one embodiment, the period of polling may occur every microsecond; in another embodiment, the polling may occur up to every minute.

A VM switch may also be triggered by a user of the computer system. In one embodiment, a hotkey is designated on a keyboard coupled to the computer system to initiate switching between the Guest VM and the Service VM. In another embodiment, a user may initiate a VM switch from a remote site over a network connection to the computer system.

Referring again to FIG. 3, if the answer to decision block 314 is no, then the Guest OS continues to execute, as depicted in block 312. If the answer to decision block 314 is yes, then the logic proceeds to a block 316 to perform a VM switch from the Guest VM to the Service VM.

Once in the Service VM, a user may perform diagnostics on the computer system using the Service OS. The user may diagnose the Guest OS and the Guest VM. Since a re-boot is not necessary to enter the Service OS, the Service OS allows live discernment of the Guest OS from the Service OS peer environment. The Service OS allows one to probe the chipset registers and log error information into the system event log (SEL). If the computer system has network capabilities, the Service OS can contact another computer system to report a system fault and transmit state information.

For example, if a customer of a server encounters a Guest OS fault, the customer can use the Service OS to capture state information and send this data to the server manufacturer for analysis. In one embodiment, the Service OS may retrieve the server chassis information such as temperature, voltage, fan speed, etc. from a BMC (Baseboard Management Controller).

The Service OS allows analysis of the Guest OS without disturbing the last state of the Guest OS. For example, the Guest OS encounters a failure while writing to a disk drive of the computer system. However, as part of the diagnosis of the Guest OS, the Service OS would like to save information to the same disk drive. The Service OS may re-take control of the disk drive controller, save the data, and then return the controller to the state that existed when the Guest OS had a write failure.

Figure 5:
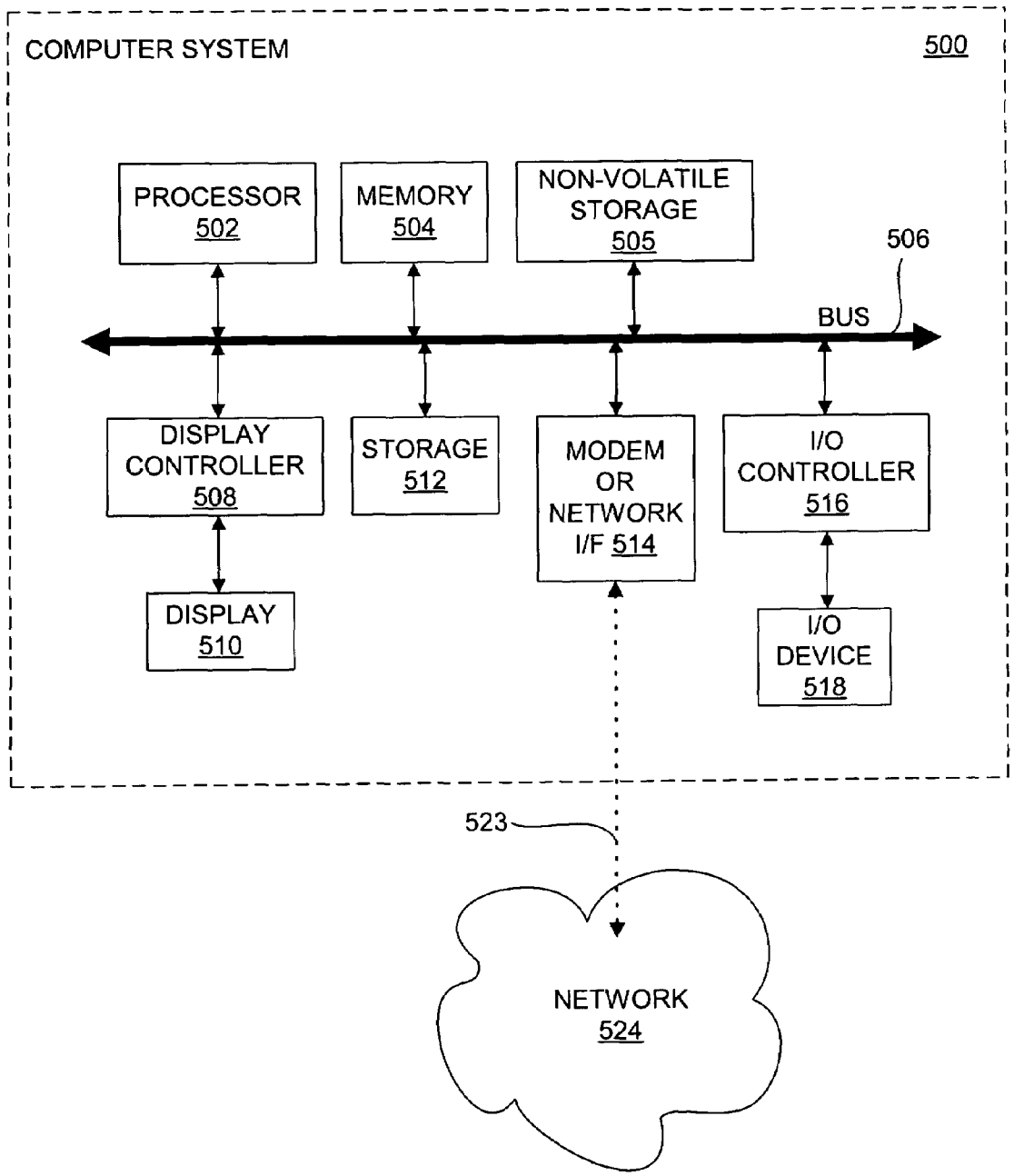
FIG. 5 is a schematic diagram illustrating one embodiment of a computer system in accordance with the teachings of the present invention.

FIG. 5 is an illustration of one embodiment of an example computer system 500 on which embodiments of the present invention may be implemented. In one embodiment, computer system 500 is a server. Examples of such a server, include, but are not limited to, the Intel/IBM Bladeserver®. Computer system 500 includes a processor 502 coupled to a bus 506. Memory 504, storage 512, non-volatile storage 505, display controller 508, input/output controller 516 and modem or network interface 514 are also coupled to bus 506. The computer system 500 may also include a BMC (Baseboard Management Controller) (not shown) to monitor critical hardware chassis components of the system. The computer system 500 interfaces to external systems through the modem or network interface 514. This interface 514 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 523 is received/transmitted by modem or network interface 514 to communicate with computer system 500. In the embodiment illustrated in FIG. 5, carrier waive signal 523 is used to interface computer system 500 with a computer network 524, such as a local area network (LAN), wide area network (WAN), or the Internet. In one embodiment, computer network 524 is further coupled to a remote computer (not shown), such that computer system 500 and the remote computer can communicate.

Processor 502 may be a conventional microprocessor including, but not limited to, an Intel Corporation x86, Pentium, or Itanium family microprocessor, a Motorola family microprocessor, or the like. Memory 504 may include, but not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 508 controls in a conventional manner a display 510, which in one embodiment may be a cathode ray tube (CRT), a liquid crystal display (LCD), and active matrix display or the like. An input/output device 518 coupled to input/output controller 516 may be a keyboard, disk drive, printer, scanner and other input and output devices, including a mouse, trackball, trackpad, joystick, or other pointing device.

The computer system 500 also includes non-volatile storage 505 on which firmware and/or data may be stored. Non-volatile storage devices include, but are not limited to Read-Only Memory (ROM), Flash memory, Erasable Programmable Read Only Memory (EPROM), Electronically Erasable Programmable Read Only Memory (EEPROM), or the like.

Storage 512 in one embodiment may be a magnetic hard disk, an optical disk, or another form of storage for large amounts of data. Some data may be written by a direct memory access process into memory 504 during execution of software in computer system 500. It is appreciated that software may reside in storage 512, memory 504, non-volatile storage 505 or may be transmitted or received via modem or network interface 514.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

It will be appreciated that computer system 500 is one example of many possible computer systems that have different architectures. For example, computer systems that utilize the Microsoft Windows operating system in combination with Intel microprocessors often have multiple buses, one of which may be considered a peripheral bus. Network computers may also be considered as computer systems that may be used with the present invention. Network computers may not include a hard disk or other mass storage, and the executable programs are loaded from a corded or wireless network connection into memory 504 for execution by processor 502. In addition, handheld or palmtop computers, which are sometimes referred to as personal digital assistants (PDAs), may also be considered as computer systems that may be used with the present invention. As with network computers, handheld computers may not include a hard disk or other mass storage, and the executable programs are loaded from a corded or wireless network connection into memory 504 for execution by processor 502. A typical computer system will usually include at least a processor 502, memory 504, and a bus 506 coupling memory 504 to processor 502.

It will also be appreciated that in one embodiment, computer system 500 is controlled by operating system software that includes a file management system, such as a disk operating system, which is part of the operating system software. For example, one embodiment of the present invention utilizes Microsoft Windows as the operating system for computer system 500. In other embodiments, other operating systems that may also be used with computer system 500 include, but are not limited to, the Apple Macintosh operating system, the Linux operating system, the Microsoft Windows CE operating system, the Unix operating system, the 3Com Palm operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
   loading a virtual machine monitor (VMM) to support a service virtual machine (VM) and a guest VM of a computer system;
   invoking a service operating system (OS) in the service VM during the pre-boot phase of the computer system, the service OS to allow observation of a guest OS;
   invoking the guest OS in the guest VM to begin a guest OS runtime of the computer system, wherein invoking the guest OS is initiated by a switch from the service VM; and
   performing in response to a fault of the guest OS a VM switch from the guest VM and to the service VM during the guest OS runtime without rebooting the computer system.

2. The method of claim 1 wherein the VMM to operate in accordance with instructions stored in a non-volatile storage device of the computer system.

3. The method of claim 1, further comprising switching from the guest VM to the service VM in response to a trap event, wherein the trap event includes detecting a violation of a policy of the computer system by the VMM.

4. The method of claim 3, further comprising setting the policy of the trap event during the pre-boot phase of the computer system.

5. The method of claim 1, further comprising:
   periodically checking for a fault condition of the guest OS by the VMM; and
   switching to the service VM if the VMM detects the fault condition.

6. The method of claim 1, further comprising switching to the service VM from the guest VM in response to a user request.

7. The method of claim 1, further comprising unloading the VMM and executing the guest OS in a non-virtual machine environment of the computer system.

8. The method of claim 1 wherein the VMM is loaded during the pre-boot phase of the computer system.

9. The method of claim 1 wherein switching between the guest VM and the service VM is performed by firmware of the computer system.

10. The method of claim 1 wherein operations of the VMM are assisted by microcode of a processor of the computer system.

11. An article of manufacture comprising:
a machine-storage medium including a plurality of instructions which when executed by computer perform operations comprising:
loading a virtual machine monitor (VMM) during a pre-boot phase of a computer system, the VMM to support a service virtual machine (VM) and a guest VM of the computer system;
booting a service operating system (OS) during a pre-boot phase of a computer system in the service VM, wherein the service OS to provide tools to diagnose a guest operating system of a computer system;
booting the guest OS in the guest VM to begin a guest OS runtime of the computer system, wherein booting the guest OS is initiated by a switch from the service VM; and
performing in response to a fault of the guest OS a VM switch from the guest VM and to the service VM during the guest OS runtime without rebooting the computer system.

12. The article of manufacture of claim 11 wherein execution of the plurality of instructions further perform operations comprising performing the VM switch from the service VM to initiate the booting of the guest OS.

13. The article of manufacture claim 11 wherein the VMM to operate in accordance with an Extensible Firmware Interface (EFI) framework standard.

14. The article of manufacture of claim 11 wherein execution of the plurality of instructions further perform operations comprising:
establishing a trap event of the computer system, wherein the trap event includes detecting a violation of a policy of the computer system by the VMM; and
performing the VM switch from the guest VM to the service VM in response to detecting the trap event.

15. The article of manufacture of claim 11 wherein execution of the plurality of instructions further perform operations comprising
establishing a polling event of the computer system, wherein the polling event includes periodically checking for a fault condition of the guest OS by the VMM; and
performing the VM switch from the guest VM to the service VM in response to detecting the fault condition of the guest OS during the polling event.

16. The article of manufacture of claim 11 wherein execution of the plurality of instructions further perform operations comprising performing the VM switch from the guest VM to the service VM in response to a user request to perform the VM switch.

17. The article of manufacture of claim 11 wherein execution of the plurality of instructions further perform operations comprising unloading the VMM and executing the guest OS in a non-virtual machine environment of the computer system.

18. The article of manufacture of claim 11 wherein the VM switch is performed by firmware of the computer system.

19. The article of manufacture of claim 11 wherein the VM switch is assisted by microcode of a processor of the computer system.

20. A computer system, comprising:
a processor; and
at least one flash device operatively coupled to the processor, the at least one flash device including firmware instructions which when executed by the processor perform operations comprising:
loading a virtual machine monitor (VMM) on the computer system during a pre-boot phase of the computer system;
booting a service operating system (OS) in a service virtual machine (VM) during the pre-boot phase, the service OS to enable analysis of the computer system;
booting a guest OS in a guest VM of the computer system in response to a VM switch from the service OS to the guest OS without rebooting the computer system; and
performing the VM switch from the guest VM to the service VM during an OS runtime of the guest OS in response to a fault of the guest OS.

21. The computer system of claim 20 wherein the fault of the guest OS comprises violation of a policy setting of the computer system.

22. The computer system of claim 21 wherein execution of the plurality of instructions further perform operations comprising generating a user interface during the pre-boot phase to receive the policy setting to trigger the VM switch during the OS runtime of the guest OS.

23. The computer system of claim 20 wherein the fault is detected during a periodic computer system check by the VMM to determine a status of the guest OS.

24. The computer system of claim 20 wherein execution of the plurality of instructions further perform operations comprising performing the VM switch in response to a user request.

25. The computer system of claim 20 wherein the processor includes microcode to assist operations of the VMM.

26. The computer system of claim 20 wherein the firmware to operate in accordance wit an Extensible Firmware Interface (EFI) framework standard.

* * * * *